United States Patent [19]
White et al.

[11] 4,081,115
[45] Mar. 28, 1978

[54] FISHING ROD SUPPORT BELT

[75] Inventors: Billy H. White, 4374 Lantern Dr.; William R. Griffin, 2220 Garden St., both of Titusville, Fla. 32780

[73] Assignees: Billy H. White; William R. Griffin; Stanley R. Andrews, all of Titusville, Fla.

[21] Appl. No.: 646,606

[22] Filed: Jan. 5, 1976

[51] Int. Cl.² ............................................. A45F 5/00
[52] U.S. Cl. ................................. 224/5 E; 43/21.2; 248/226.5; 248/514
[58] Field of Search ............... 224/5 E, 5 V, 4 J, 4 K, 224/5 R, 5 A, 5 B, 5 H, 5.1, 8 R, 22, 26; 43/23, 25, 21.2; 248/514, 226 E; 2/300, 311, 312, 320, 52; 403/114, 164, 165

[56] References Cited

U.S. PATENT DOCUMENTS

| | | | |
|---|---|---|---|
| 171,967 | 1/1876 | Arnold | 224/5.1 |
| 1,720,982 | 7/1929 | Van Brunt | 224/5 E |
| 2,010,587 | 8/1935 | Fisher et al. | 403/114 X |
| 2,271,136 | 1/1942 | Geiger | 224/5 E |
| 2,675,551 | 4/1954 | Ser Vaas | 2/52 |
| 2,709,812 | 6/1955 | Kanzow | 2/52 |
| 2,742,210 | 4/1956 | Bortz et al. | 224/5 E |
| 3,009,612 | 11/1961 | Fischett | 224/5 E |
| 3,782,613 | 1/1974 | Davis | 224/5 E |
| 3,885,721 | 5/1975 | Vanus | 224/5 E |

FOREIGN PATENT DOCUMENTS

| | | | |
|---|---|---|---|
| 563,781 | 9/1958 | Canada | 2/52 |

*Primary Examiner*—Evon C. Blunk
*Assistant Examiner*—Donald T. Underwood
*Attorney, Agent, or Firm*—Duckworth, Hobby, Allen, and Pettis

[57] ABSTRACT

A support belt for engaging the handle end of a fishing rod. The support belt includes a waist-engaging member manufactured of a self-supportive resilient material, with the belt having a front surface and arms coupled thereto for engaging the waist of the wearer. Each of the arms includes at a distended end thereof a section which is bowed against the small of the back of the wearer. The releasable support belt assumes a flexible C-shape for engaging the waist of the wearer. The support belt also includes a coupler releasably attached to the front surface of the belt for receiving and restraining therein the handle end of a fishing rod. In a specific embodiment this coupling device includes a ball and socket assembly including nodes and channels therein for prohibiting the rotation of the fishing rod about a longitudinal axis thereof.

13 Claims, 5 Drawing Figures

FISHING ROD SUPPORT BELT

BACKGROUND OF THE INVENTION

1. Field of the Invention

This invention relates to a holder for a fishing rod and in particular to a belt formed of a self-supportive resilient material for engaging the waist of the wearer and having removably mounted thereon means for coupling to and engaging the handle end of the fishing rod. The coupling device may be removed and another one fastened to the belt for a different type rod handle.

2. Description of the Prior Art

When fishing for large game fish it is helpful to be able to use both hands, one hand grasping the rod and the other hand operating the reel, in the process of bringing in the fish which has been hooked. Various harness designs have been disclosed which require straps and buckles for securing the harness about the waist, the shoulders of the torso. These harness designs require a substantial period for adjustment when the harness is first worn or later transferred between fishermen. Also, the harness becomes uncomfortable due to the constricting effect that the straps and buckles have around sections of the torso and abdomen which are continuously moving during the reeling process.

Geiger in U.S. Pat. No. 2,271,136 discloses a harness having an abdominal shield attached by means of a ball and socket movable coupling to a cup for receiving the handle end of the fishing rod. However, the abdominal shield requires a large and uncomfortable harness which engages the shoulders, torso and abdomen and which must be buckled in place to provide the required rigidity. A more simplified harness is disclosed by Fischett, in U.S. Pat. No. 3,009,612, which includes a plastic or pliable abdominal section held in place by a belt and buckles attached thereto. The abdominal shield also includes a pivotted cup for retaining the handle end of the fishing rod therein. Haislip in U.S. Pat. No. 2,139,188 discloses a belt having a pivotted cup movably attached thereto for restraining the handle end of the fishing rod therein. Davis in U.S. Patent 3,782,613 discloses an integral base pad and cup made of a molded elasteomeric material for receiving the handle end of the fishing rod.

Other devices for holding fishing rods are disclosed by Vanus in U.S. Pat. No. 3,885,721; Smedley et al in U.S. Pat. No. 2,735,596; and Hipwood in U.S. Pat. No. 1,174,319. Other references which disclose fishing rod holders include Bortz et al in U.S. Pat. No. 2,742,210 and Goss in U.S. Pat. No. 2,537,456.

Ullrich, Jr. discloses in U.S. Pat. No. 3,035,747 a back pack, for carrying scuba gear and the like, composed of a self-supporting resilient material having a curved surface shaped to the contour of the human back with appendages extending therefrom to engage the shoulders and the waist of the wearer. The large back pack unit runs longitudinal to the torso and thus is not readily adaptable for frontal mounting, such as that required for use in holding the handle end of a fishing rod.

BRIEF DESCRIPTION OF THE DRAWINGS

Other objects, features and advantages of this invention will be apparent from a study of the written description of the drawings in which.

SUMMARY OF THE INVENTION

A support belt for engaging the handle end of a fishing rod. The support belt includes a waist-engaging member of a self-supportive resilient material having a front surface and arms coupled thereto engaging the waist of the wearer. The belt further includes engaging means coupled to the front surface of the waist-engaging member for receiving and restraining therein the handle end of the fishing rod. Each of the arms of the waist-engaging member includes at the distended end thereof a section for bowing against the small of the back of the wearer for exerting a wrap around tension thereon. A cup-shaped receptacle is included for receiving and restraining therein the butt end of the fishing rod. In a first preferred embodiment, a ball and socket coupling device is releasably interposed between the belt and the cup-shaped receptacle for prohibiting the rotation of the fishing rod or boat rod about a longitudinal axis thereof. In a second preferred embodiment, the cup-shaped receptacle for a surf rod is releasably attached to the front surface of the waist-engaging member.

DETAILED DESCRIPTION OF THE PREFERRED EMBODIMENT

Figure 1:
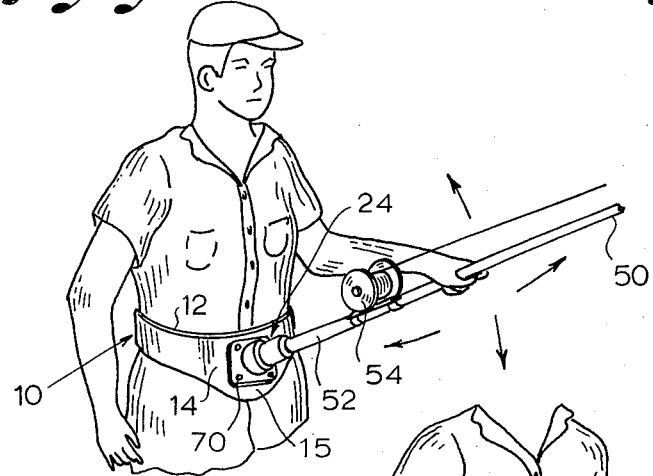
FIG. 1 illustrates a first preferred embodiment of the fishing rod support belt as coupled to the waist of the wearer.
Figure 5:
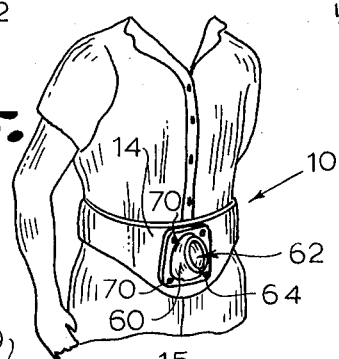
FIG. 5 illustrates a second preferred embodiment of the fishing rod support belt.

A support belt for engaging the handle end of a fishing rod is illustrated as 10 in FIGS. 1 and 5. The support belt 10 includes a waist-engaging member 12 formed of a self-supportive resilient material having a front surface 14 and two arms 16 and 18 of the same self-supportive resilient material coupled thereto for engaging the waist of the wearer. Each of the arms 16 and 18 includes at a distended end thereof sections, 17 and 19 respectively, for being bowed against the small of the back of the wearer. The bowed sections 17 and 19 exert a wrap around tension on the lower part of the back of the wearer for securing the waist-engaging member 12 against the torso in reaction to the displacement forces incident thereon. Thus, the front surface 14, and the arms 16 and 18 coupled thereto, form a releasable C-shaped belt for engaging the waist of the wearer. The front surface 14 includes a downward depending section 15 for enlarging the frontal surface 14 pressing against the abdomen of the wearer to provide for a more even distribution of the forces incident thereupon. This downward depending section 15 or abdominal section is contoured to the shape of the abdomen and has a curved lower surface for allowing the bending of the legs as the wearer assumes a sitting position.

The arms 16 and 18 are formed of the self supportive resilient material so as to tightly engage the waist of the wearer. However, the wearer may deform the C-shaped belt 10 by opening the arms 16 and 18 thereof and wrapping them about the waist section and abdomen. The belt 10 may then be rotated so that the front surface 14 is adjacent to the abdomen of the wearer. The tension forces within the arms 16 and 18 will then tightly grasp the waist of the wearer and prevent the rotation or displacement of the waist-engaging member 12 therefrom.

Figure 3:
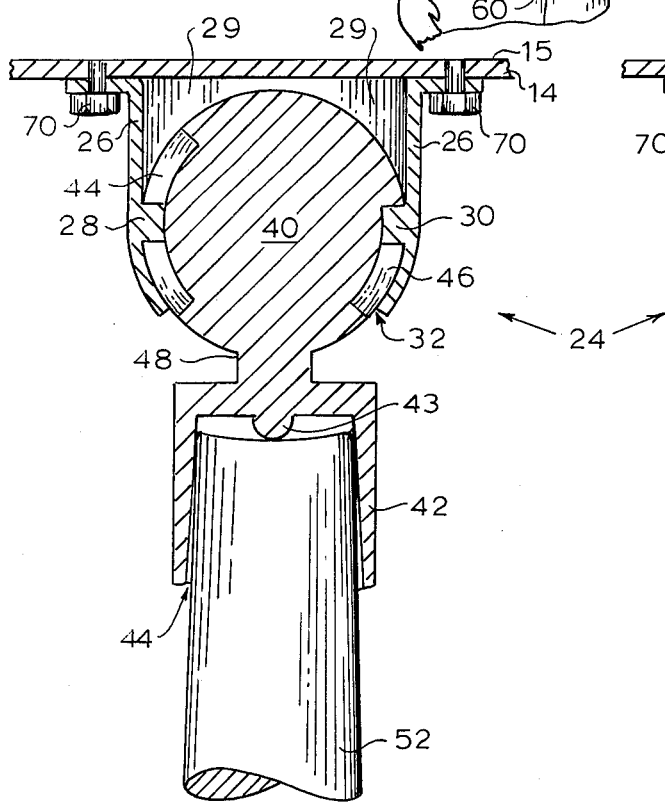
FIG. 3 illustrates a partially sectioned side view of the ball and socket apparatus for coupling the handle end of the fishing rod to the support belt.
Figure 4:
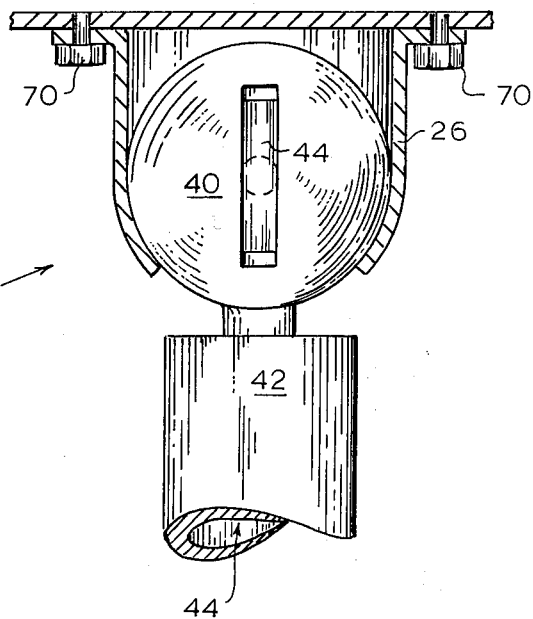
FIG. 4 illustrates a partially sectioned ventral view of the ball and socket device for coupling the fishing rod to the support belt.

As shown in FIGS. 1, 3 and 4, a first preferred embodiment of the means for engaging the handle end of the boat rod or other fishing rod are shown generally as 24. A generally spherical-shaped socker 16 has a planar surface thereof releasably attached to the front surface 14 of the waist-engaging member 12 by four nut and bolt combinations 70. The socket 26 has a spherical cavity therein for engaging and restraining the movement of a ball 40 coupled thereto. The ball 40 has a cup-shaped or cylindrical receptacle 42 attached thereto. The longitudinal or central axis of the receptacle 42 intersects the center of the ball 40. Also, the receptacle 42 includes a cylindrical or tapered cavity 44 therein which is coaxial to the longitudinal axis of the receptacle 42. The diameter of the cylindrical or tapered cavity 44 is determined such that the butt end or handle end 52 of a boat rod 50 (or other fishing rod) slidably communicates therein, whereby the longitudinal axis of the boat rod 50 is generally coaxial with the longitudinal axis of the receptacle 42. The receptacle 42 has elevated, crossed striations 43 for engaging the butt end 52 of a boat fishing rod 50.

The ball 40 and cylindrical receptacle may be inserted through the back of the socket 26 into the spherical cavity therein. A plate 29 conforming to the anterior surface of the belt 14 and the posterior surface of the ball 40 and having the same inside diameter as the interior of the socket 26 is inserted. This acts as a retention plate for the ball 40 and facilitates swivel action. The mouth 32 of the socket 26 is shaped to restrain the ball 40 within the spherical cavity of the socket 26.

The socket 26 includes two opposed cylindrical nodes 28 and 30 depending into the spherical cavity along a line spaced from the mouth 32 of the socket 26. The two nodes 28 and 30 are located at opposite ends of a diameter of the ball 40, the diameter being generally perpendicular to the longitudinal axis of the fishing rod 50 and the receptacle 42. The nodes 28 and 30 communicate from the socket 26 and into the channels 44 and 46 of the ball 40. The channels 44 and 46 are located on opposite sides of the ball 40 and have rectangular cross-sections for closely coupling with the cylindrical nodes 28 and 30 respectively. As shown in FIG. 3, the coupling of the nodes 28 and 30 with the channels 44 and 46, will allow the fisherman to sweep the rod 50, having the receptacle 42 and ball 40 attached thereto, in a plane parallel with the horizon, or perpendicular to the front surface 14 of the waist-engaging member 12, by pivoting the rod 50, about an axis of rotation defined by the nodes 28 and 30 communicating within the channels 44 and 46 of the socket 26, and furthermore will allow the fishing rod 50 to be varied in elevation from horizontal to nearly vertical. The short channel 46 is installed on the top when the pre-socket 26 is attached to the belt 10. This limits depression of the rod 50 below the horizontal position. The ventral channel 44 has a longer length that permits the insertion of the ball 40 into its proper place within the socket 26. The angle of elevation of the rod 50 is also limited by the interference of a neck section 48 of the ball 40 and the mouth 32 of the socket 26. Thus, the fishing rod 50 may be swept from side to side and may also be elevated above the horizontal in the process of bringing in the fish which has been hooked. However, the combination of the nodes 28 and 30 and the channels 44 and 46 will limit the rotation of the fishing rod 50 about the longitudinal axis thereof so that a fishing reel 54 attached to the fishing rod 50 will always be located in a convenient position for the wearer of the support belt 10.

A second preferred embodiment of the present invention is illustrated in FIG. 3. A cup-shaped receptacle 60 is releasably attached to the front surface 14 of the waist-engaging member 12 by four nut and bolt combinations 70. Of course, the releasable nut and bolt combinations 70 allow the wearer to interchange different handle engaging means in response to the requirements of a particular situation. The cup-shaped receptacle 60 defines a cavity 62 therein for receiving and restraining the handle or butt end 52 of the fishing rod 50. The circumference of a circumferential lip 64 defining an opening into the cavity 62 is designed to be larger than the circumference of the handle end 52 of the fishing rod 50 to allow for sufficient movement therebetween. The opening defined by the circumferential lip 64 of the cup 60 is angled or canted upward from a perpendicular to the abdomen of the wearer for receiving the handle end 52 of the fishing rod 50 in a position elevated from the horizontal. This elevated position of the fishing rod 50 is generally more comfortable for the fisherman to maintain than a completely horizontal position. The handle end 52 of the fishing rod 50 presses against the lower and back surfaces of the cup 60 so that the force along the longitudinal axis of the fishing rod 50 will press against the frontal surface 14 of the waist-engaging member 12 which is in close communication with the abdomen of the wearer of the support belt 10.

Figure 2:
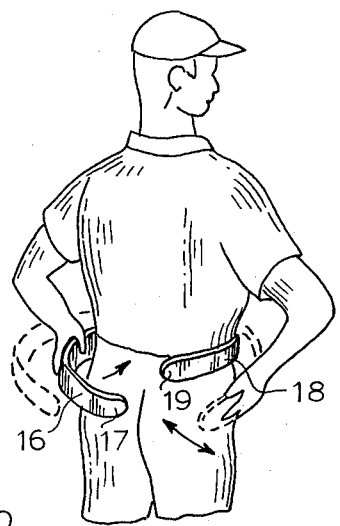
FIG. 2 illustrates the method of attaching the fishing rod support belt to the wearer.

The operation of the support belt 10 may be illustrated with reference to FIGS. 1, 2 and 3. First, the fisherman grasps the arms 16 and 18 of the waist-engaging member 12 for separating the distended ends 17 and 19 thereof. The C-shaped waist-engaging member 12 is then coupled around the waist of the wearer. Thereafter, the arms 16 and 18 are released to allow the bowed sections 17 and 19 to firmly press against the small of the back of the wearer. Therefore, the waist-engaging member 12 is firmly grasping the waist of the wearer with the front surface 14 adjacent to the abdomen. Next, the handle end 52 of the fishing rod 50 is inserted into the cup-shaped receptacle 42 or 60.

The advantages of the quick attaching feature of the fishing rod support belt will become apparent when examined in the context of a typical fishing excursion. The typical sport fishing group comprises two or four persons utilizing a common boat or fishing vessel. Each of the fishermen has his own fishing rod, with all of the fishing lines dragging behind the boat for attracting the fish. Typically, no one is wearing the fishing rod support belt, but instead the support belt is placed in a convenient location which is easily accessible to all of the fishermen. When a fish strikes at one of the trailing lines and engages the bait and hook thereon, the fisherman attending that rod merely slips into the fishing rod support belt, as described above, and inserts his fishing rod thereinto. With the present invention, this entire engagement process requires only two to three seconds, thus allowing the fisherman to immediately devote his total attention to playing the fish. This should be contrasted with the typical one to three minute period required to engage and fit all of the buckles and straps comprising the typical fishing harness.

It will be clear at this point that a fishing rod support belt has been provided which overcomes some of the problems of prior fishing harnesses. However, this invention is not to be construed as limited to the particular forms disclosed herein since these embodiments are to be regarded as illustrative rather than restrictive.

We claim:

1. A support belt for engaging the handle end of a fishing rod, comprising in combination:

a waist-engaging member of a self-supportive resilient material having a front surface and arms couple thereto for engaging the waist of a wearer;

engaging means coupled to said front surface of said waist-engaging member, said engaging means comprising a receptacle;

movable coupling means disposed between said receptacle and said front of said waist-engaging member, said movable coupling means comprising a substantially spherical socket and a ball movably disposed within said socket; and said support belt further comprising rotating limiting means including two node elements integrally disposed in spaced apart relation to one another on the interior of said socket and projecting inwardly substantially toward the center of said socket from the interior surface thereof, at least two spaced channels integrally formed in said ball and each having a substantially curvilinear, longitudinal configuration, said nodes disposed for sliding engagement with the interior of respective ones of said channels, said tow channels being disposed in substantially coplanar relation to one another and in a substantially vertical plane, one of said two channels having a shorter longitudinal dimension than the other of said channels, said shorter channel disposed to prevent elevation of the fishing rod below a perpendicular to the abdomen of the wearer, whereby rotation of the fishing rod about a longitudinal axis is prohibited.

2. The support belt as described in claim 1 wherein each of said arms includes at a distended end thereof a section for being bowed against the small of the back of the wearer.

3. The support belt as described in claim 2 wherein said bowed sections exert a wrap around tension for securing said waist-engaging member about the waist of the wearer.

4. The support belt as described in claim 3 wherein said front surface and said arms coupled thereto from a releasable C-shaped belt for engaging the waist of the wearer.

5. The support belt as described in claim 4 wherein said front section depends downward below the level of said arms for enlarging said front surface.

6. The support belt as described in claim 5 wherein said front section is contoured for comfortably communicating with the abdomen of the wearer.

7. A support belt as in claim 1 wherein said engaging means comprises a cup-shaped cavity integrally formed to said ball and thereby movably mounted to said front surface of the waist-engaging member, said cup-shaped cavity specifically disposed and configured for receiving and restraining therein a handle end of the fishing rod.

8. The support belt as described in claim 7 wherein said receptacle is releasably coupled to said front surface of said waist-engaging member.

9. The support belt as described in claim 8 wherein a mouth of said receptable opening into said cup-shaped cavity therein is canted upward from a perpendicular to the abdomen of the wearer for receiving said handle end of said fishing rod when said fishing rod is elevated from the horizontal.

10. The support belt as described in claim 9 wherein said mouth of said receptacle has a larger circumference than a circumference of said handle end of said fishing rod.

11. The support belt as described in claim 7 wherein said cup-shaped cavity within said receptacle includes tapered sides for effecting a close communication with said handle end of said fishing rod inserted therein.

12. The support belt as described in claim 7 wherein said cup-shaped cavity within said receptacle has a generally cylindrical shape for effecting a close communication along the length of said handle of said fishing rod inserted therein.

13. The support belt as described in claim 1 wherein said movable coupling means is releasably coupled to said front surface of said waist-engaging member.

* * * * *